Feb. 1, 1927.
C. B. ROGERS
BEARING
Filed March 2, 1925
1,616,002
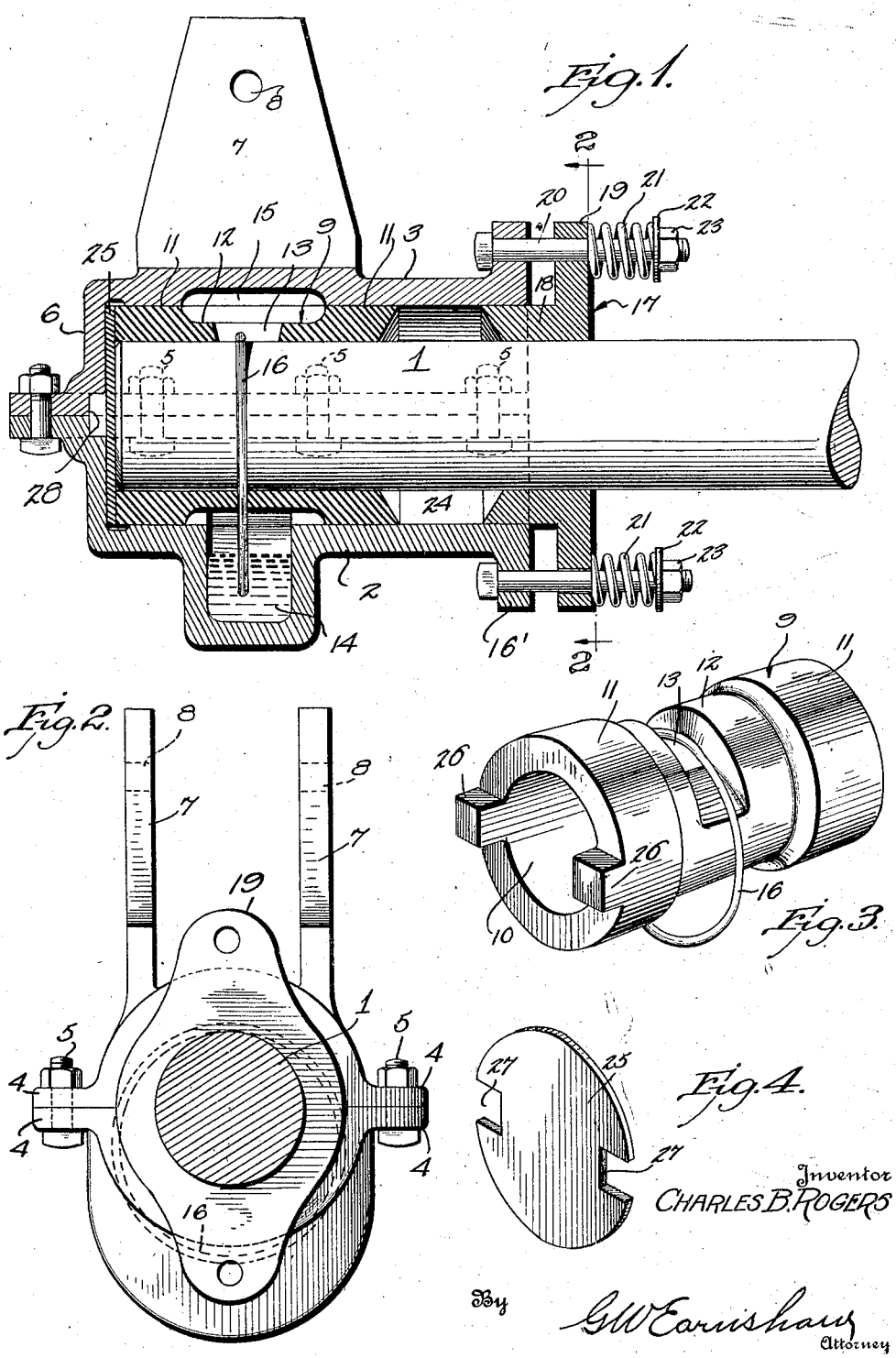

Patented Feb. 1, 1927.

1,616,002

UNITED STATES PATENT OFFICE.

CHARLES B. ROGERS, OF JOPLIN, MISSOURI.

BEARING.

Application filed March 2, 1925. Serial No. 12,741.

This invention relates to bearings, and more particularly to a bearing adapted to receive the end of a shaft.

While the bearing forming the subject matter of the present invention is adapted for use in a number of places, it is particularly suitable for use in elevator pits to receive the ends of the shaft of the lower pulley.

An object of the invention is to provide an enclosed bearing having an oil reservoir to lubricate the shaft and adapted to exclude water, sand, and other foreign matter from the shaft.

More specifically, the bearing consists of a casing enclosing the end of the shaft, having lubricating means arranged therein, and a stuffing box to seal the projecting portion of the shaft.

In the accompanying drawings, I have shown one embodiment of the invention. In this showing:

Figure 1 is a longitudinal sectional view through the bearing in the end of the shaft, Figure 2 is a vertical sectional view substantially on line 2—2 of Figure 1, with the stuffing box cover or gland removed, Figure 3 is a perspective view of the bearing member showing the lubricating means, and, Figure 4 is a similar view of an end plate.

Referring to the drawings, the reference numeral 1 designates a shaft, such as the shaft arranged in an elevator pit on which the lower pulley is mounted. The bearing forming the subject matter of the present invention consists of a two-part casing adapted to enclose the end of the shaft. As shown, the casing consists of a lower section 2 and an upper section 3. These sections are provided with flanges 4, adapted to receive bolts 5 by means of which the sections are secured to each other. One end of the casing is closed, as at 6, and the end of the shaft is received in this portion of the casing. As shown, one of the sections may be provided with suitable projections or arms 7 having openings 8 therein for the reception of bolts or other suitable fastening elements by means of which the bearing may be anchored. As shown, the internal diameter of the casing is greater than the diameter of the shaft, and a bearing member 9 is adapted to be arranged within the casing and receive the shaft. This member is provided with a central bore 10 substantially the same size as the external diameter of the shaft. It is also provided with suitable enlargements or thickened portions 11 adjacent each end, which snugly fit within the casing. Between these thickened portions, the bearing member is reduced in thickness, as at 12, and the central portion of this reduced section is provided with a slot 13, which is adapted to be arranged on top of the shaft when the bearing is assembled. The casing is provided with a well 14, arranged in vertical alinement with the slot 13 and the internal diameter of the casing is slightly greater at points above the well than throughout the rest of its length, as indicated at 15. A lubricating ring 16 is mounted on the shaft and received in the slot, the lower portion of the ring depending into the well 14.

The other end of the casing is provided with a peripheral flange 16′, having spaced openings arranged therein and a stuffing box cover 17 surrounds the adjacent portion of the shaft. This cover consists of a cylindrical portion 18, which is adapted to extend into the end of the casing, around the shaft, and a flange 19. The flange is provided with suitable openings adapted to aline with the openings in the flange 16 for the reception of bolts 20. Springs 21 are arranged on these bolts with their inner ends contacting with the outer face of the stuffing box cover. Outwardly of these springs, I provide washers 22 and nuts 23. The bearing member and the stuffing box cover form a stuffing box 24, which is adapted to be filled with any suitable packing and which packing is held under compression by the stuffing box cover 17, the bolts 20 and the springs 21.

The operation of the device will be apparent from the foregoing description. The end of the shaft is arranged in the bearing and as the shaft rotates, the ring 16 rotates intermittently to feed oil from the reservoir 14 to the shaft. The outer end of the shaft is received within the closed end of the bearing casing and any foreign matter is prevented from working into the bearing at this end. As shown, an end plate 25 of steel or other hard metal, may be arranged between the end 6 of the casing and the end of the shaft to receive any thrust due to lateral vibration. This plate may be replaced when worn. As shown, it may be secured to the bearing by means of projections 26, formed on the adjacent end of the bearing which pass through notches or recesses 27 in the end plate and are received in alined notches 28 formed in the end 6 of the bearing casing. The arrangement of the projections 26 within the recesses 28 prevents rotation of the bearing member.

At the other end of the shaft, the stuffing box formed by the stuffing box cover 17, which functions as a packing gland, and the packing arranged in the space 24, hermetically seal the shaft to prevent foreign matter from entering the bearing.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

An end bearing for shafts comprising a casing adapted to surround a shaft and having an end wall arranged adjacent the end of the shaft, said end wall being provided with a pair of spaced recesses, a bearing member arranged in said casing, projections formed on the end of said bearing member and adapted to be received in said recesses to prevent rotation of said bearing member, an end plate arranged between the end of said shaft and the end wall of said casing, said end plate being provided with notches for the passage of said projections, and means for sealing the projection portion of the shaft at the opposite end of said bearing.

In testimony whereof, I affix my signature.

CHARLES B. ROGERS.